United States Patent [19]

Bingham et al.

[11] Patent Number: 4,571,722

[45] Date of Patent: Feb. 18, 1986

[54] INTEGRATED SERVICE MULTIPLEX EQUIPMENT

[75] Inventors: John Bingham, Dunmow; Allen W. Oliver, Bishops Stortford, both of England

[73] Assignee: International Standard Electric Corporation, New York, N.Y.

[21] Appl. No.: 626,356

[22] Filed: Jun. 29, 1984

[30] Foreign Application Priority Data

Jul. 13, 1983 [GB] United Kingdom ............ 8318898

[51] Int. Cl.⁴ .................................. H04J 3/06
[52] U.S. Cl. ........................... 370/106; 370/100
[58] Field of Search .................. 370/100, 106, 104

[56] References Cited

U.S. PATENT DOCUMENTS

| | | | |
|---|---|---|---|
| 3,065,302 | 11/1962 | Kaneko ............................. | 370/100 |
| 3,836,722 | 9/1974 | Muller et al. ..................... | 370/100 |
| 3,959,588 | 5/1976 | Kelly et al. ...................... | 370/100 |
| 4,247,945 | 1/1981 | Seibel .............................. | 370/100 |
| 4,276,642 | 6/1981 | Siglow et al. .................... | 370/106 |

*Primary Examiner*—Douglas W. Olms
*Assistant Examiner*—Wellington Chin
*Attorney, Agent, or Firm*—John T. O'Halloran; Thomas F. Meagher

[57] ABSTRACT

A time division multiplex system which has a total bandwidth of 64Kbit/s and has this bandwidth split up into 80 channels each of 800 bits/sec. Three speech channels are provided, each using 20 of these channels, 12 channels are used to provide a 9.6Kbit/s data channel, 4 are used to provide for 50-110 baud start-stop channels and another 4 are used to provide a 3.2Kbit/s signalling channel.

To provide fast sync, a sync pattern consisting of two sync words and a channel number is sent at the same time on all of the channels, and the receiving side monitors for the 19th channel. When it finds what is coming in at the time, it first achieves bytes alignment between the received byte stream and the local byte stream, then it checks the respective channel numbers. The difference between them gives an offset which is used to adjust the demultiplexing logic.

4 Claims, 7 Drawing Figures

MUX MODULE SOFTWARE DIAGRAM

INTEGRATED SERVICE MULTIPLEX EQUIPMENT

BACKGROUND OF THE INVENTION

The present invention relates to a time division multiplex system, and especially to the provision of a fast operating synchronisation in such a system and to the verification of synchronisation.

SUMMARY OF THE INVENTION

According to the present invention, there is provided a method of establishing synchronisation in a time division multiplex system. To establish synchronisation at a multiplex module of the system, a locally-generated synchronisation pattern is applied to an input of the module such that a preset byte pattern occurs in each of a number of the multiplex channels. The preset byte pattern includes one or more synchronisation bytes and one or more channel number bytes. At the receiving side of the module, a synchronisation detector responds to the content of the nth channel as received by the module. The detector responds to the synchronisation byte or bytes in the received byte stream to establish byte alignment between the nth channel at the module and the received byte stream without taking account of the channel number at which the byte alignment has been achieved. The detector records from said channel number the identity of the channel of the received stream at which byte alignment has been achieved and determines therefrom an offset which defines the difference (if any) between the nth channel and the channel at which said byte alignment has been achieved. The channel offset thus defined is applied to the multiplex module's demultiplexing logic to so control it that the channel number received in the nth channel is correct. In response to the establishment of said byte alignment, the said channel number bytes each have one bit set to a condition indicating that frame alignment has been achieved. When a correct channel number byte has been received, with its said one bit set, the system assumes that synchronisation has been achieved.

During operation, the synchronisation status is continually confirmed by the arrival of valid signalling frames, and not by any specific framing pattern.

BRIEF DESCRIPTION OF THE DRAWINGS

Embodiments of the invention will now be described with reference to the accompanying drawings, in which.

DETAILED DESCRIPTION

Figure 1:
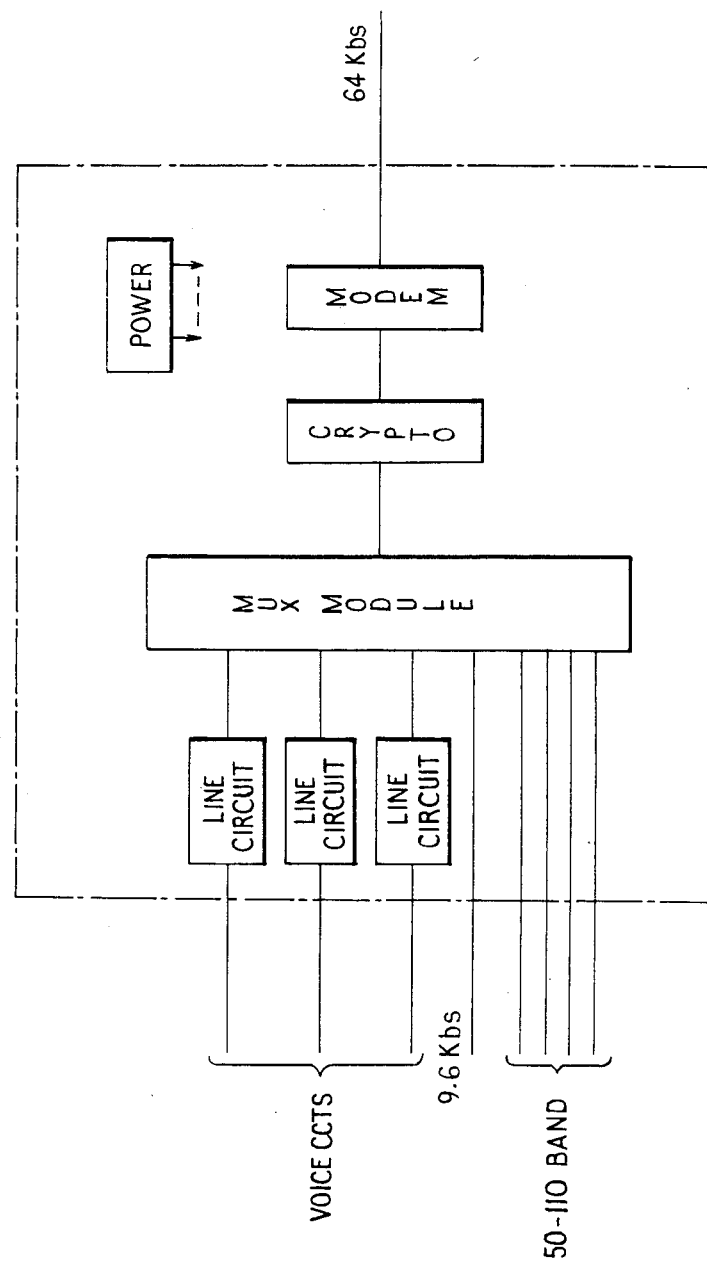
FIG. 1 is a schematic block diagram of a four-channel time division multiplex (MUX) module in which the synchronisation method of the present invention is used.

The system to be described herein is based on the use of a 64Kbs digital channel which interconnects at least two modules such as that shown in FIG. 1. In this case the 64Kbit/s channel is regarded as consisting of 80×800 bit/s channels, which are used as follows:

(a) 20 channels are used for each of the three 16Kbit/s CVSDM (Constantly Variable-Slope Delta Modulation) voice channels.
(b) 12 channels are used for a synchronous 9.6Kbit/s data channel.
(c) 1 channel is used for each of four 50–110 baud telegraph channels. The telegraph signals on each of these channels are sampled at the 800 bit/s rate, giving a maximum isochronous distortion of less than +10%, −4% at 110 baud. This is well within the permitted limits defined in CCITT Rec. R. 120.
(d) 4 channels are used to give a 3.2kbit/s signalling channel between MUX Modules. The signalling channel continuously carries the current status of each of the interfaces including E/M, Loop Disconnect and Ring-down for the voice channels and the point-to-point data signalling. This channel is also used to continuously monitor frame alignment.

The structure of the signalling frame used is based on the now well-known HDLC (High level Data Link Control) frame structure (BS 5397: part 1: 1981). The frame consists of 6 bytes as follows:

Byte 1: Flag (01111110).
Bytes 2–4: 24 signalling bits carrying the signalling information above, and spare capacity.
Bytes 5–6: Frame checking sequence.

Flag emulation is avoided by "zero bit insertion" in accordance with BS 5397, and the frame checking sequence is generated in accordance with BS 5397.

The signalling frame, which contains the current signalling status, is continuously transmitted. Frames detected as being in error at the receiver are discarded. This gives a continuous update of the signalling status at a rate exceeding 55 frames per second. This is more than adequate to give transparency to E and M Loop Disconnect, Ring-down and point-to-point data signalling. These signals are regenerated at the receive MUX Module, to ensure that minimum and maximum duration requirements are met.

We now consider briefly the synchronisation procedure. On application of power, the MUX Module is "initialised" to the "Out of Sync" state. In this state it commands the Crypto Module to "Go to Sync". When this has been done, "Crypto in Sync" signal is sent to the MUX Module, which then enters the "Frame Alignment" state and applies a 1920-bit framing pattern to the 64Kbit/s channel. This pattern is chosen such that the following pattern appears on each of the 800 bit/s channels.

| SYN | SYN | CHANNEL NUMBER |
| --- | --- | --- |

The receiving side of the module connects a sync detector to the assumed channel 19. Thus the 1920 bit pattern is made up of 80×3×8 bit bytes. This uses the two SYN bytes to so adjust the receiver timing as to achieve byte alignment on the received channel, and then it records the actual channel number being received. This may be channel 19, or it may be a different channel in the range of 0 to 79, depending on the sync condition. The MUX Module then calculates a channel offset which is input to the demultiplexing logic so that the channel number received on the sync channel is correct. The MUX Module then enters the "Received Framing" state, in which the MUX Module continues to transmit the 64Kbit/s framing pattern, but modified such that a bit is set in each Channel Number byte to indicate that received frame alignment has been achieved. When the MUX Module detects and verifies a correct Channel Number with the received frame alignment bit set, Frame alignment has been achieved. In the absence of transmission errors, this occurs within 160mS of entering the "Frame Alignment" state. The MUX module then enters the "In Service" state and connects traffic and signalling to the 64Kbit/s channel. This offset thus sets the receiving logic correctly for the incoming bit stream.

If frame alignment is not achieved within a preset time of entering the "Frame Alignment" state, the MUX Module resets to the "Out of Sync" state and the procedure is repeated.

Whilst in the "In Service" state, frame alignment is monitored by the correct receipt of frames on the signalling channel. If no valid frames are received for another preset period, the MUX Module enters the "Out of Sync" state, and the procedure is re-initiated.

Any loss of bit element integrity in the 64Kbit/s channel causes a loss in synchronisation of the crypto logic. This is detected by the frame alignment monitoring, and results in the initiation of the synchronisation procedure.

It is assumed that the 64Kbit/s bearers are configured to accept timing from an external high stability standard. This ensures that all transmission links in the network operate with an adequate timing stability.

In view of the above the Four Channel Multiplex locks its transmitted timing to a timing reference recovered from the incoming 64Kbit/s signal from the rest of the network.

In the arrangement described so far, the 9.6Kbit/s terminal is operating in a synchronous mode and can reference its transmit timing to a timing signal supplied from the Four Channel Multiplex. Should it be intended to use existing equipment which can not operate in this mode then the following alterations are required:

(a) Synchronous Terminal

If it is required to operate with a synchronous terminal with independent transmit and receive timing, then a speed buffer is included in the 9.6Kbit/s transmit side of the MUX Module. On entry to the "In Service" state, bits from the terminal are stored in the speed buffer until it is half full (centre position), after which bits are output from the speed buffer, in synchronisation with the MUX Module's stable timing, and are multiplexed with the other channels. When the speed buffer is either empty or full, it is reset to its centre position, causing loss of bit element integrity at that time.

The length of the speed buffer depends on the stability of the terminals used. Parameters which affect the choice of this value are the transmit clock stability of the terminal, the period for which it is required that bit element integrity be maintained, and the acceptable delay introduced by the speed buffer. For example, consistent sets of values would be as follows:

| (i) Stability of terminal | Very high |
| --- | --- |
| Min. period of bit element integrity | 3.7 hours |
| Buffer length | 256 bits |
| Max. delay | 27 mS |
| (ii) Stability of terminal | High |
| Min. period of bit element integrity | 1.5 hours |
| Buffer length | 1024 bits |
| Max. delay | 107 mS |

(b) Asynchronous (Start-Stop) Terminal

If the 9.6Kbit/s terminals used operate in start-stop mode, then there is no need for timing references across the interface. However it is necessary to perform start-stop/synchronous conversion in the MUX Module. At the transmit end, the start and stop elements are removed from characters received from the terminal, and the data elements are transmitted synchronously in the 9.6Kbit/s channel. The receive end of the link reconstitutes the start-stop characters with the start and stop elements. The removal of the start and stop elements from the characters gives sufficient bandwidth within the 9.6Kbit/s channel to provide for the following:

(i) Terminals running at the high end of their clock tolerance (i.e. faster than 9.6Kbit/s).

(ii) Character alignment within the synchronous 9.6Kbit/s channel.

(iii) Full transparency to inter-character idle condition, character over-run (break) condition, and NULL and DEL characters. (Some simplification could be achieved if transparency to break was not offered and if either the NULL of DEL characters could be reserved).

There is no synchronisation problem associated with the telegraph channels as the proposed arrangements described herein offer full transparency with isochronous distortion within the limits specified in CCITT Rec. R.120 up to 200 baud. (Acceptable performance will also be achieved at 300, but this is not guaranteed).

A key element of the hardware used in the present method is the use of Type 8274 I/O devices (commercially available) for handling the synchronisation and the signalling channel. This device is also used if the 9.6Kbit/s asynchronous terminal described above is required.

The hardware of the system is based upon general purpose SSI (Small Scale Integrated), MSI (Medium Scale Integrated), and microprocessor components. The time division multiplex functions are implemented in TTL or CMOS, SSI and MSI, and the control and signalling functions are implemented in 8-bit microprocessor components.

Figure 2:
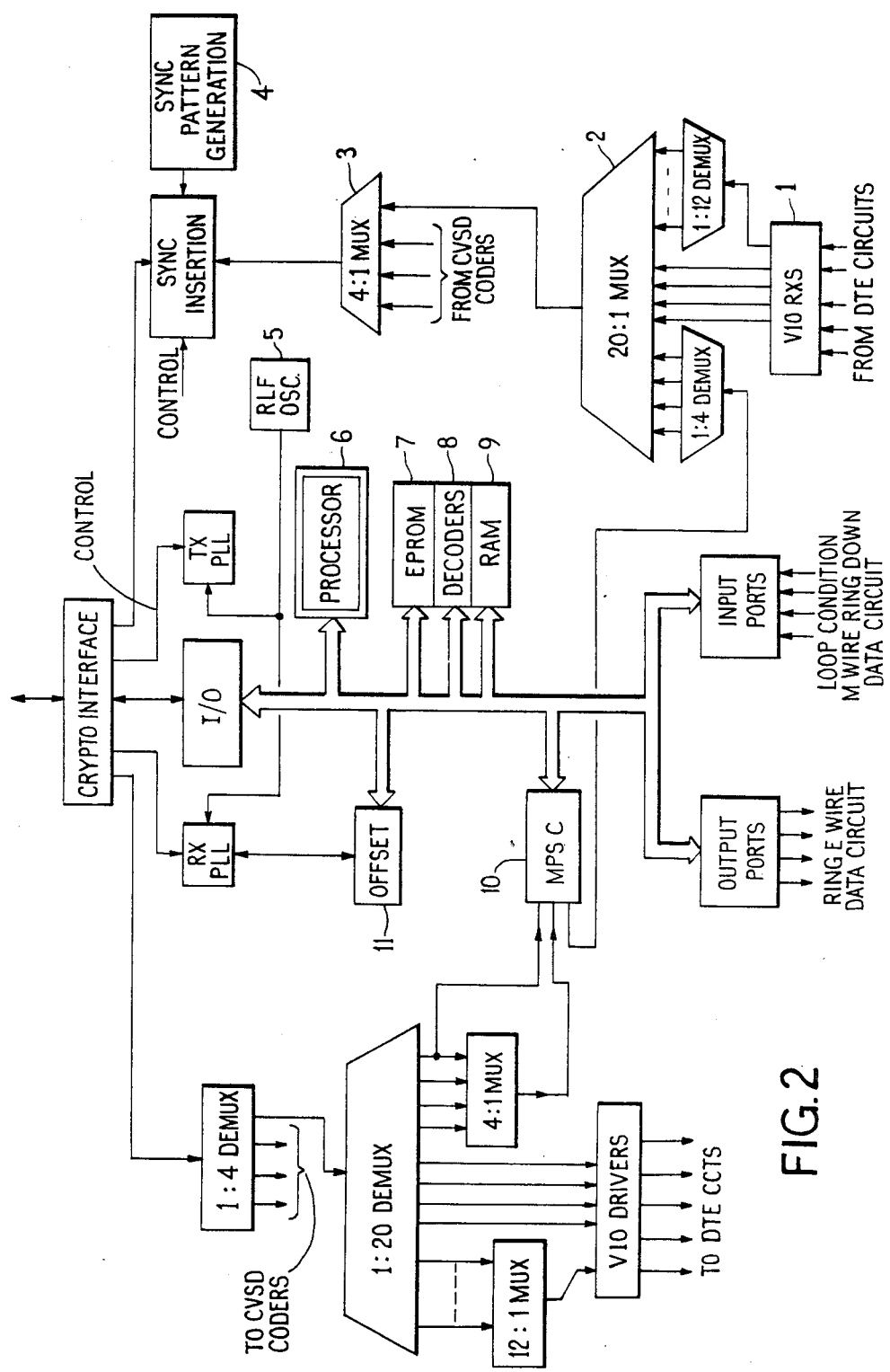
FIG. 2 is a more detailed block diagram of the MUX module of FIG. 2.

The equipment is subdivided into the following functional areas:

(a) Multiplexing Function
(b) Demultiplexing Function
(c) Timing Circuits
(d) Control and Signalling
(e) Interface Circuits A block diagram of the hardware is shown in FIG. 2.

MULTIPLEXING FUNCTION

The multiplexing function includes two stages of multiplexing. The first stage 1 multiplexes the data terminal equipment (DTE) interfaces and signalling channel via a further multiplexer 2 into a 16Kbit/s channel and the second stage 3 combines this with three other 16Kbit/s channels, from CVSD codecs, into the 64Kbit/s output interface. All stages are driven continuously by timing signals locked to the transmit timing reference from the Timing Circuits.

The first stage of multiplexing is based upon 20 channels at 800 bit/s. The following multiplex structure is created by a series of interconnected multiplexer and demultiplexer components. Thus channels 0–11 form the twelve 800 bit/sec. channels which together form the 9.6Kbit/s channels, channels 12–15 respectively are the four 50–110 band start-stop channels, and channels 16 to 19 form the control and signalling channel for the whole module.

The sync-pattern generation circuit 4, in response to a command from the control and signalling function, replaces the 64Kbit/sec. aggregate signal to the crypto interface with a fast sync. pattern which enables the control and signalling function to rapidly identify the phase of the received multiplex, as indicated above. This is done by sending one of two 64Kbit/sec. aggregate bit streams which, when demultiplexed to 800 bit/sec., yield three-character sequences of SYN-SYN-CHANNEL NO (see above), which are compatible with the input-output device used.

The sequences are as follows, where X is 0 when sync. has not been acquired in the reverse direction, or 1 to indicate that sync. has been acquired.

| Channel Number | Three Character Sequence | | |
| --- | --- | --- | --- |
| 00 | 00010110 | 00010110 | X0000000 |
| 01 | 00010110 | 00010110 | X0000001 |
| 02 | 00010110 | 00010110 | X0000010 |
| 78 | 00010110 | 00010110 | X1001110 |
| 79 | 00010110 | 00010110 | X1001111 |

DEMULTIPLEXING FUNCTION

This function performs the reverse operation to that of the multiplexing function described above. Timing signals are locked to the receive timing reference, as can be seen from the connection to the two phase-locked loops RX-PLL and TX-PLL.

An output is provided from bit 19 of the 1:20 demultiplexer to one port of a multi-protocol serial controller (MPSC) in the Control and Signalling function to permit reception of the fast sync sequence.

TIMING CIRCUITS

The design of the MUX Module permits the two directions of transmission in the multiplexer to operate asynchronously. To achieve this, separate transmit and receive reference clock inputs at 64KHz are supported at the interface to the crypto. In view of the network synchronisation considerations referred to above, it is assumed that the transmit timing reference is derived from the received timing in the Modem Module. The DTE (Data Terminal Equipment) interface rate of 9.6Kbit/s is not an integer submultiple of 64Kbit/s, so the phase locked loops are provided to generate a lowest common multiple frequency. There are implemented using digital techniques from a single high stability reference oscillator 5.

Divider circuits generate the required frequencies for each direction of transmission. In the transmit direction the dividers run freely and generate a local frame reference. In the receive direction the divider circuit incorporates a programmable frame offset circuit to enable the control and signalling function to achieve fast sync.

CONTROL AND SIGNALLING

The control and signalling function is implemented in a standard microprocessor system consisting of 8085 processor 6, 2764 EPROM 7 and 6116 RAM 8 together with parallel input/output circuits 9 and an 8274 MPSC 10.

In the active link state the microprocessor 9 scans control signals and transmits them via one receive channel of the MPSC 10, in HDLC mode, on the 3.2Kbit/s channel. In the receive direction, valid frames received from the 3.2Kbit/s channel via the MPSC 10 are used to update appropriate control signals. Frames received in error are discarded.

During the synchronisation phase the microprocessor monitors the 19th channel of the 20 bit frame via the second MPSC receive channel, operating in synchronous character mode. Upon receipt of a preset number, e.g. 5, of identical characters, an appropriate offset is written into the receive timing circuit via the offset block 11.

INTERFACE CIRCUITS

Circuits are provided at the DTE interfaces which conform to CCITT recommendation V10 with V28 compatible termination, other interfaces being at TTL compatible levels.

SOFTWARE ASPECTS

Figure 3:
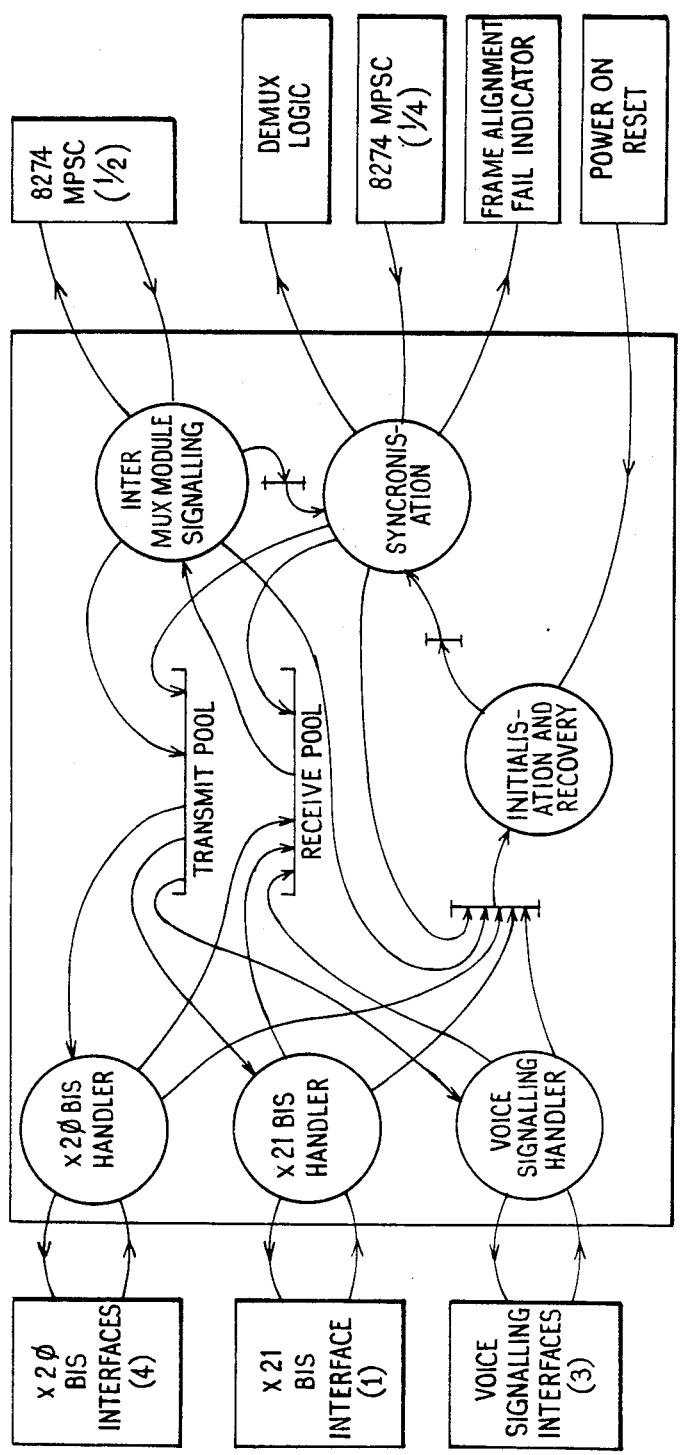
FIG. 3 is a software diagram.
Figure 4:
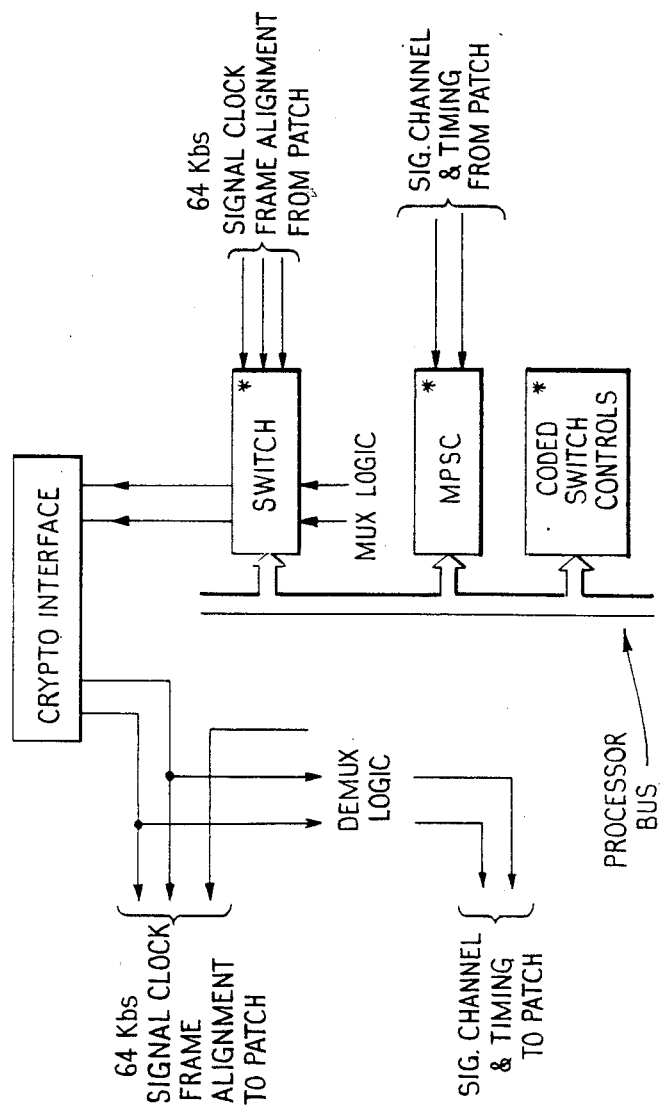
FIGS. 4, 5, 6 and 7 represent schematically how a system such as that of FIGS. 1 and 2 is modified to provide a patching facility.

The software sub-system for the MUX Module has been developed using MASCOT as the design and development discipline, and CORAL 66 as the programming language. This is suported by a proprietary development system hosted on a PDP11. A MASCOT Activity, Channel and Pool (ACP) diagram for the software sub-system is shown in FIG. 3 and described below.

(a) Initialisation and Recovery This activity responds to a reset signal from the hardware, initialises the programmable hardware devices and the software database and then commands the Synchronisation activity to initiate the synchronisation procedure. The activity also receives messages from other activities following inconsistencies which are unresolvable by the source activity (e.g. out of range data). The activity then takes appropriate recovery action or re-initialises the MUX Module, Interfaces and 64Kbit/s link.

(b) Synchronisation In response to a command from the Initialisation and Recovery activity or a message from the Inter MUX Module Signalling activity indicating that frame alignment has been lost, the activity runs the initialisation procedure.

(c) Iner MUX Module Signalling This controls the signalling described above. It transmits the data stored in the Transmit Pool, and writes received data into the Receive Pool. The activity maintains a timer which is reset on receipt of a valid frame. If this timer exceeds a preset value, the Synchronisation activity is informed that frame alignment has been lost.

(d) X.20 bis Handler This controls the X.20 bis (CCITT recommended) point-to-point signalling on the telegraph interfaces. Status information is written to the Transmit Pool and read from the Receive Pool.

(e) X.21 bis Handler This controls the X.21 bis (CCITT recommended) point-to-point signalling on the 9.6Kbit/s interface. Status information is written to the Transmit Pool and read from the Receive Pool.

(f) Voice Signalling Handler This scans the E and M, Loop Disconnect, and Ring Down signals from the Line Circuit Module, performs appropriate persistency checks, and transfers the results to the Transmit Pool. In the reverse direction it reads status signals from the Receive Pool and outputs them to the Line Circuit Module, ensuring that minimum timing requirements are met.

Figure 5:
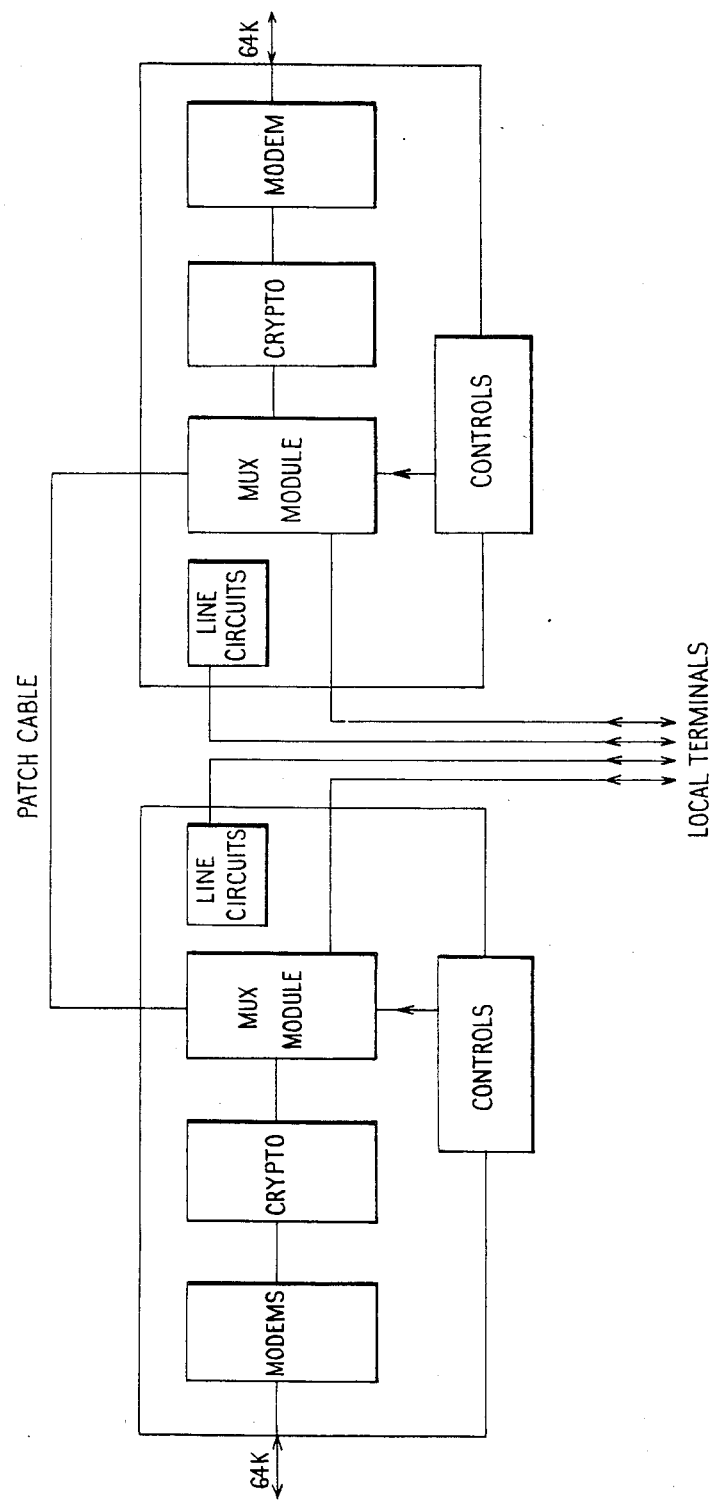

Patch Facility In some cases it is needed to implement a patching facility between two local Four Channel Multiplex Equipments. The modifications needed to do this are now described with reference to FIGS. 4, 5, 6 and 7. The patch cable between the two equipments, FIG. 5, carries the following signals with CCITT Rec. V10 terminations:
 (a) 64Kbit/s aggregate signal in each direction
 (b) 64Kbit/s clock in each direction
 (c) 64Kbit/s frame alignment signal in each direction
 (d) 3.2Kbit/s signalling channel in each direction
 (e) 3.2Kbit/s clock in each direction.

It will be seen that patching is carried out at the 64Kbit/s level. The MUX Module makes available the 64Kbit/s received aggregate signal and the demultiplexed 3.2Kbit/s signalling channel to the MUX Module of the equipment with which it is patched. The MUX Module uses a conventional cyclic write, acrylic read time switching element to select the source of the transmitted 64Kbit/s signal from either the patch channel or the local multiplex on a per-channel basis.

The content of the transmitted signalling channel are selected in software from either the local inputs or the content of the signalling channel on the patch cable. Coded switches are equipped on the Four Channel MUX to control the source of each channel on the transmitted 64Kbit/s aggregate. If contradictory combinations are selected by the operator, a warning lamp is lit.

Figure 6:
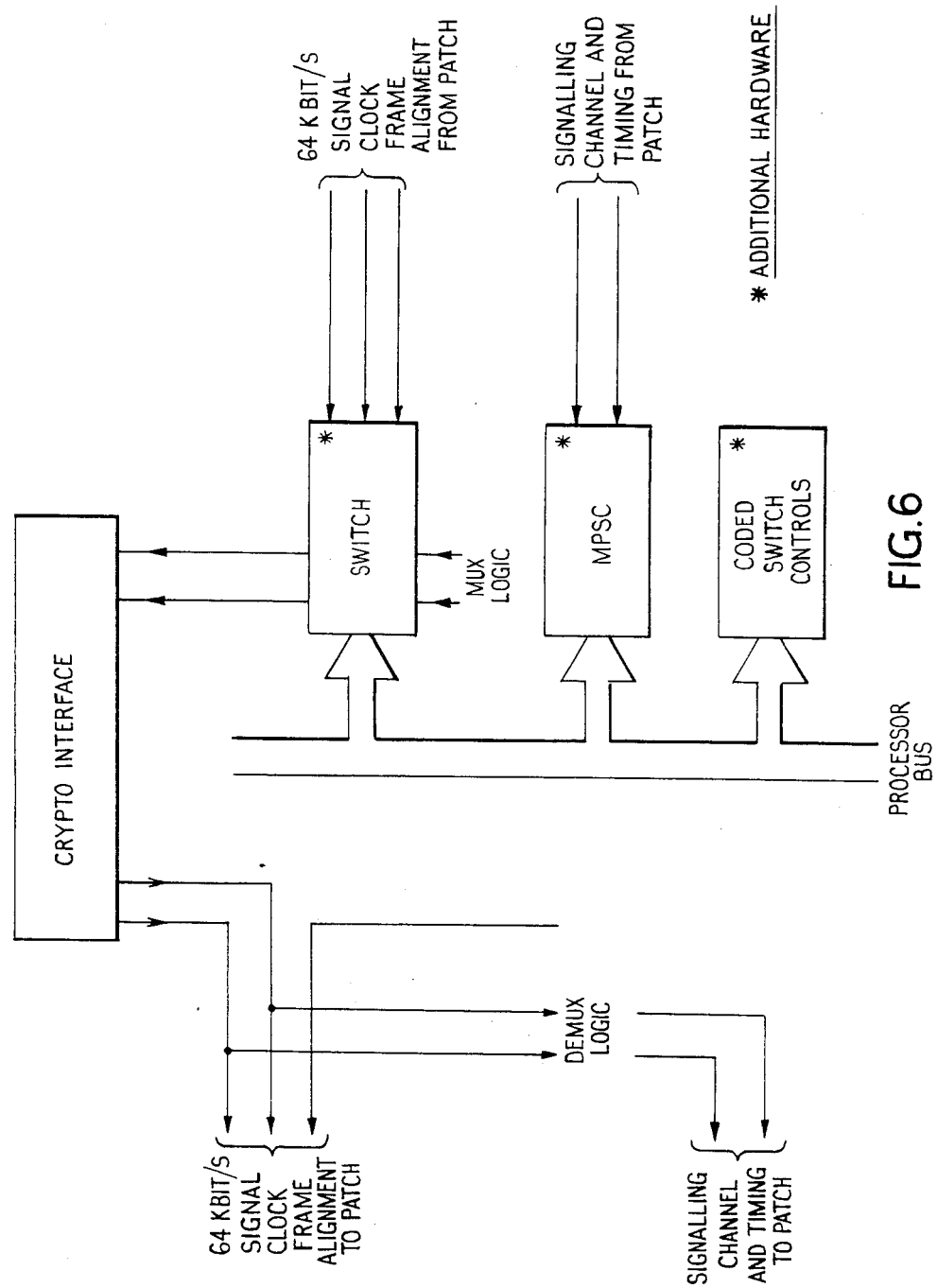

Hardware Aspects Modifications to FIG. 2 are shown in FIG. 6. The switch incorporates a bit alignment function on the patch channel and is controlled by a channel map received from software. Some of the multiplexing functions shown in FIG. 1 are incorporated in the switch.

An 8274 I/O device is used to receive the signalling from the patch channel and input it to the software. Parallel I/O devices are used to read the status of the coded switches and output a signal to illuminate a lamp if the software detects inconsistent settings of the switches.

Figure 7:
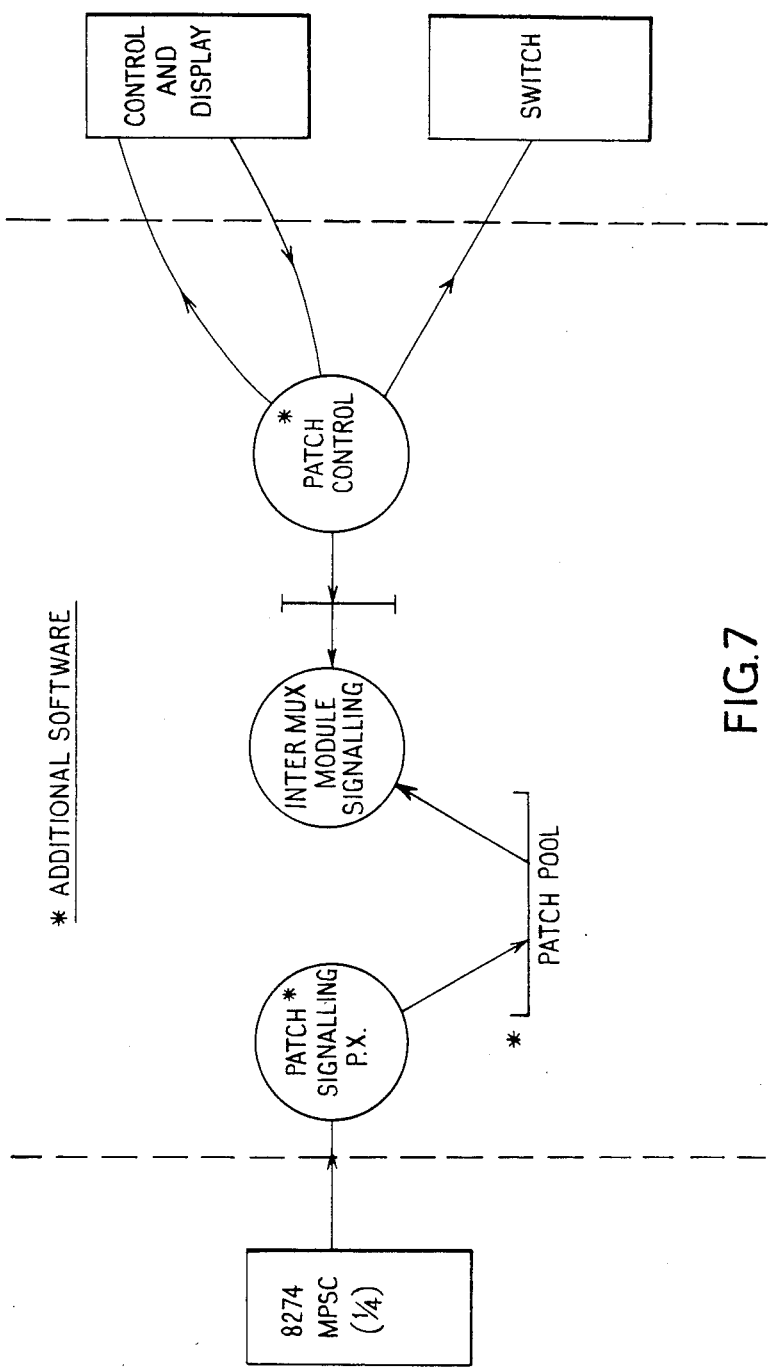

Software Aspects FIG. 7 shows the software modifications to FIG. 3. The Patch Signalling activity receives signalling information from the patch channel and writes it to the Patch Pool. This activity is similar to the receive part of the Inter MUX Module Signalling activity. The Patch Control activity performs the following functions:
 (a) Read the status of the coded switches.
 (b) Output a signal to illuminate a warning lamp if the patch selection is inconsistent.
 (c) Command the Inter MUX Module as to whether it should assemble its signalling frame from the Transmit Pool or from the Patch Pool, on a per-channel basis.
 (d) Output a channel map to the switch logic.

We claim:

1. A method of establishing synchronisation in a time division multiplex system, which comprises:
 applying a locally-generated synchronisation pattern to an input of a multiplex module of said system so that a unique byte pattern, including a framing pattern and a channel number with a status indicator, occurs in each of a plurality of the multiplex channels of said module,
 detecting at the receiving side of said module the content of the nth channel as received by said module,
 responding to said framing pattern in said received byte stream to establish alignment between said nth channel at said module and said received byte stream without taking account of the unique pattern at which said alignment has been achieved,
 recording from said unique pattern the identity of the channel of the received stream at which alignment has been achieved,
 determining from said identity recording an offset which defines the difference between said nth channel and said channel at which said byte alignment has been achieved,
 applying said channel offset to said multiplex module's demultiplexing logic to control said logic so that the channel number received in said nth channel is correct,
 setting said status indicator of each of said channel numbers, in response to establishment of said byte alignment, to a condition indicating that frame alignment has been achieved, and
 assuming that synchronisation has been achieved when a correct channel number byte has been received with its said status indicator set.

2. A method of establishing synchronisation in a time division multiplex system, which comprises:
 applying a locally-generated synchronisation pattern to an input of a multiplex module of said system so that a preset byte pattern, including at least one synchronisation byte and at least one channel number byte, occurs in each of a plurality of the multiplex channels of said module,
 detecting at the receiving side of said module the content of the nth channel as received by said module,
 responding to said synchronisation bytes in said received byte stream to establish byte alignment between said nth channel at said module and said received byte stream without taking account of the channel number at which said byte alignment has been achieved,
 recording from said channel number the identity of the channel of the received stream at which byte alignment has been achieved,
 determining from said identity recording an offset which defines the difference between said nth channel and said channel at which said byte alignment has been achieved,
 applying said channel offset to said multiplex module's demultiplexing logic to control said logic so that the channel number received in said nth channel is correct,
 setting one bit of each of said channel number bytes, in response to establishment of said byte alignment, to a condition indicating that frame alignment has been achieved, and
 assuming that synchronisation has been achieved when a correct channel number byte has been received with its said one bit set.

3. Apparatus for establishing synchronisation in a time division multiplex system, comprising:
 means to apply a locally-generated synchronisation pattern from a synchronisation pattern generator to an input of a multiplex module of said system so that a preset byte pattern, including at least one synchronisation byte and at least one channel number byte, occurs in each of a plurality of the multiplex channels of said module,
 means for detecting said byte stream at the receiving side of said module,
 means for responding to the content of the nth channel as received by said module, means, responsive to said detecting and responding means, for causing, when said synchronisation bytes are detected, establishment of byte alignment between said nth channel at said module and said received byte stream, without taking account of the channel number at which the byte alignment has been achieved, processing means, responsive to said detecting and responding means, for determining and recording from said channel number the identity of said channel of said received streams at which byte alignment has been achieved, means for determining from said identity an offset which defines the difference between said nth channel and said channel at which said byte alignment has been achieved.

means, responsive to said offset determining means, for applying said offset to said multiplex module's demultiplexing logic to control said logic so that the channel number received in said nth channel is correct, means, responsive to said establishment of byte alignment, to set one bit of each of said channel number bytes to a condition indicating that frame alignment has been received, and means for assuming that synchronisation has been achieved in response to a correct channel number byte being received with its said one bit set.

4. A time division multiplex system, as claimed in claim 3, further comprising:

means for providing a plurality of time channels, means for providing a plurality of speech channels from a first block of said time channels, means for providing a signalling and control channel from a second block of said time channels, and means for providing a start-stop telegraph channel from a plurality of single ones of said time channels.

* * * * *